(12) United States Patent
Dignitti

(10) Patent No.: US 6,186,256 B1
(45) Date of Patent: Feb. 13, 2001

(54) BATTERY RETAINING SYSTEM FOR A CHILDREN'S RIDE-ON VEHICLE

(75) Inventor: Daniel M. Dignitti, Hamburg, NY (US)

(73) Assignee: Mattel, Inc., El Segundo, CA (US)

( * ) Notice: Under 35 U.S.C. 154(b), the term of this patent shall be extended for 0 days.

(21) Appl. No.: 09/245,177

(22) Filed: Feb. 5, 1999

(51) Int. Cl.[7] ................................................. B60R 16/04
(52) U.S. Cl. ............................................. 180/68.5; 24/546
(58) Field of Search .................................. 180/68.5, 65.1; 248/503, 503.1; 429/96, 100; 24/546, 563, 637

(56) References Cited

U.S. PATENT DOCUMENTS

| | | | |
|---|---|---|---|
| 3,333,810 | * 8/1967 | Schlapman | 248/503 |
| 4,339,105 | * 7/1982 | Witt | 248/500 |
| 4,355,695 | * 10/1982 | Leskovec | 180/68.5 |
| 4,696,508 | * 9/1987 | Brautigam | 296/65.05 |
| 4,716,632 | * 1/1988 | Perl | 24/289 |
| 5,004,081 | * 4/1991 | Custer | 180/68.5 |
| 5,222,711 | * 6/1993 | Bell | 248/503 |
| 5,307,890 | * 5/1994 | Huang | 180/65.1 |
| 5,477,936 | * 12/1995 | Sugioka et al. | 180/68.5 |
| 5,845,724 | * 12/1998 | Barrett | 180/65.1 |

* cited by examiner

Primary Examiner—J. J. Swann
Assistant Examiner—David R. Dunn
(74) Attorney, Agent, or Firm—Kolisch, Hartwell, Dickinson, McCormack & Heuser

(57) ABSTRACT

A battery retaining system for securing a battery in a children's ride-on vehicle. A battery compartment is disposed on the vehicle and configured to receive the battery. A battery compartment lid attaches to the battery compartment. A battery retaining clip is coupled to the battery compartment and is movable between a locked position in which the clip holds the battery in place, and an unlocked position. Optionally, the retaining clip is configured to block installation of the battery compartment lid unless the clip is in the locked position.

17 Claims, 7 Drawing Sheets

BATTERY RETAINING SYSTEM FOR A CHILDREN'S RIDE-ON VEHICLE

FIELD OF THE INVENTION

The present invention is directed to battery retaining systems, and more particularly, to a battery retaining system for a children's ride-on vehicle that alerts a rider if the battery is not properly secured within the vehicle.

BACKGROUND

Battery-powered children's ride-on vehicles are a popular toy for children. The batteries for these vehicles are usually carried within a compartment on the vehicle. Typically, the compartment is easily accessible so that the battery may be removed or recharged.

To prevent injury or accident, the battery should be securely held within the compartment. A battery that is loosely held within the compartment may fall on its side and any toxic or acidic contents of the battery may leak out. Furthermore, the battery may fall out of the compartment if the vehicle tips over, thereby possibly damaging the battery and injuring the rider. Even if the vehicle does not tip over, a battery that is loosely held within the compartment may become disconnected from the drive mechanism that propels the vehicle. A loosely-held battery may also shift during operation of the vehicle, thus changing the center of gravity of the vehicle and making the it difficult to operate. Finally, a moving battery may shake or "clatter" within the battery compartment and falsely signal to a user that the vehicle is broken.

One method of securing the battery is to construct a battery compartment that is approximately the same shape and size as the battery. However, the compartment may not have enough room for the wires and connectors that connect the battery to the drive mechanism. In addition, future battery designs would be limited by the dimensions of the compartment.

Another securing method is to install a bracket over the sides and top of the battery. However, this type of bracket is difficult to attach and remove, especially if the battery compartment is relatively small. Furthermore, a rider may not be aware if the brace is inadequately secured within the compartment.

SUMMARY OF THE INVENTION

The invention provides a battery retaining system for securing a battery in a children's ride-on vehicle. The invented system includes a battery compartment disposed on the vehicle and configured to receive the battery. Also included is a battery retaining clip coupled to the battery compartment and movable between a locked position in which the clip holds the battery in place, and an unlocked position. In one embodiment, a battery compartment lid is provided to attach to the battery compartment and the retaining clip is configured to block installation of the battery compartment lid unless the clip is in the locked position.

Optionally, the retaining clip is pivotally coupled to the battery compartment and may be pivoted to an opened position to allow the battery to be loaded into, or unloaded from, the battery compartment. As a further option, the battery compartment lid may form a seat of the ride-on vehicle.

BRIEF DESCRIPTION OF THE DRAWINGS

FIG. 9 is a detail view of a portion of FIG. 3, showing the tabs of the battery compartment lid received into the battery compartment sockets, and showing the retaining clip in the unlocked position and the guide members deflecting against the retaining clip to block attachment of the battery compartment lid.

DETAILED DESCRIPTION

Figure 1:
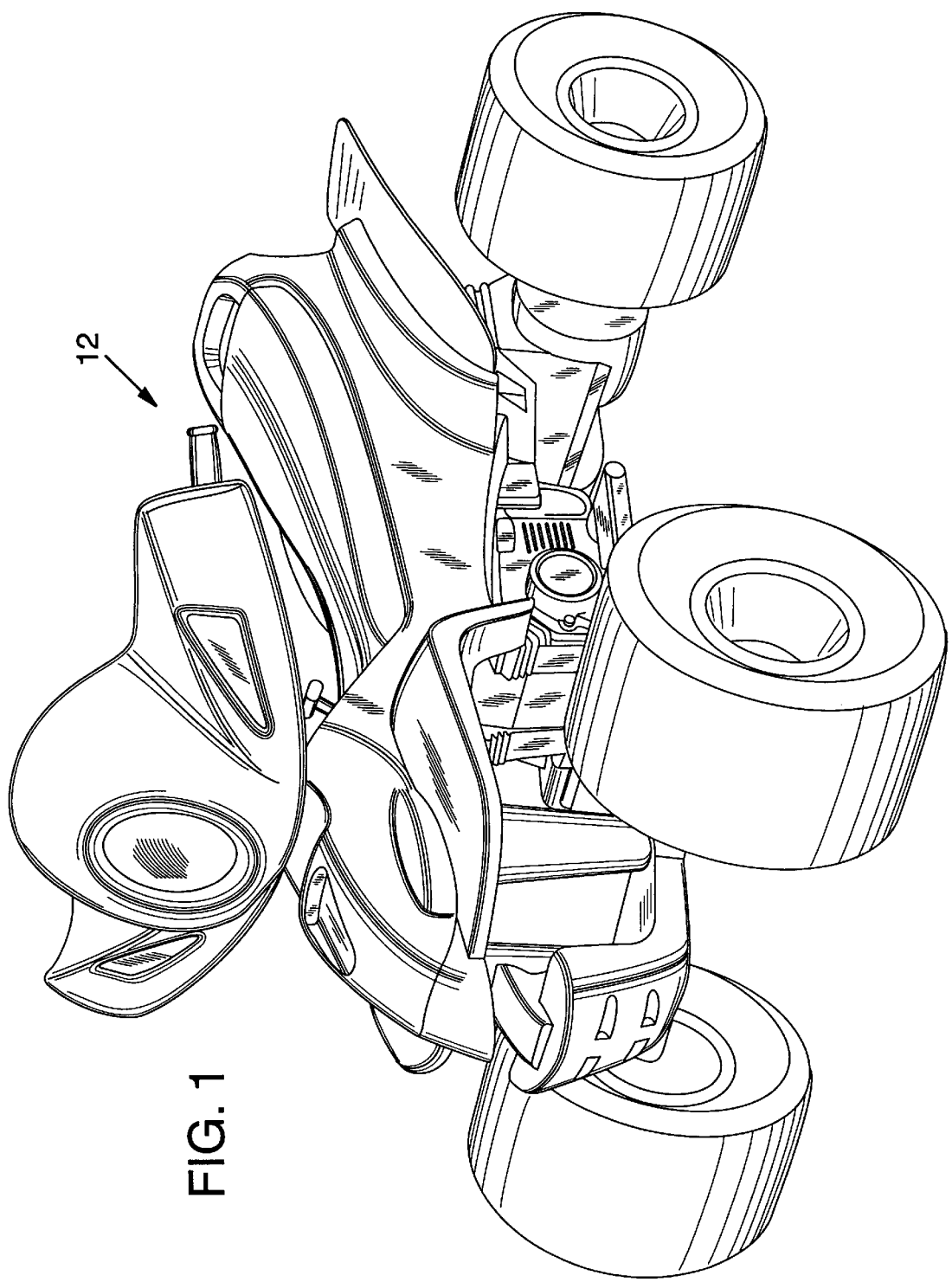
FIG. 1 is a perspective view of a children's ride-on vehicle in the form of an all-terrain vehicle (ATV).

FIG. 1 illustrates a battery-powered, children's ride-on vehicle 12 configured for operation by a child or small adult. Vehicle 12 typically includes a rider-support frame having a drive unit coupled to one or more wheels and powered by an on-board power source. Although vehicle 12 is depicted in the form of an all-terrain vehicle (ATV), it will be appreciated that the invented battery retaining system described below is not limited to a particular type or shape of ride-on vehicle. Rather, the invented battery retaining system may be used with any of the various types of children's ride-on vehicles including cars, trucks, motorcycles, etc.

Figure 2:
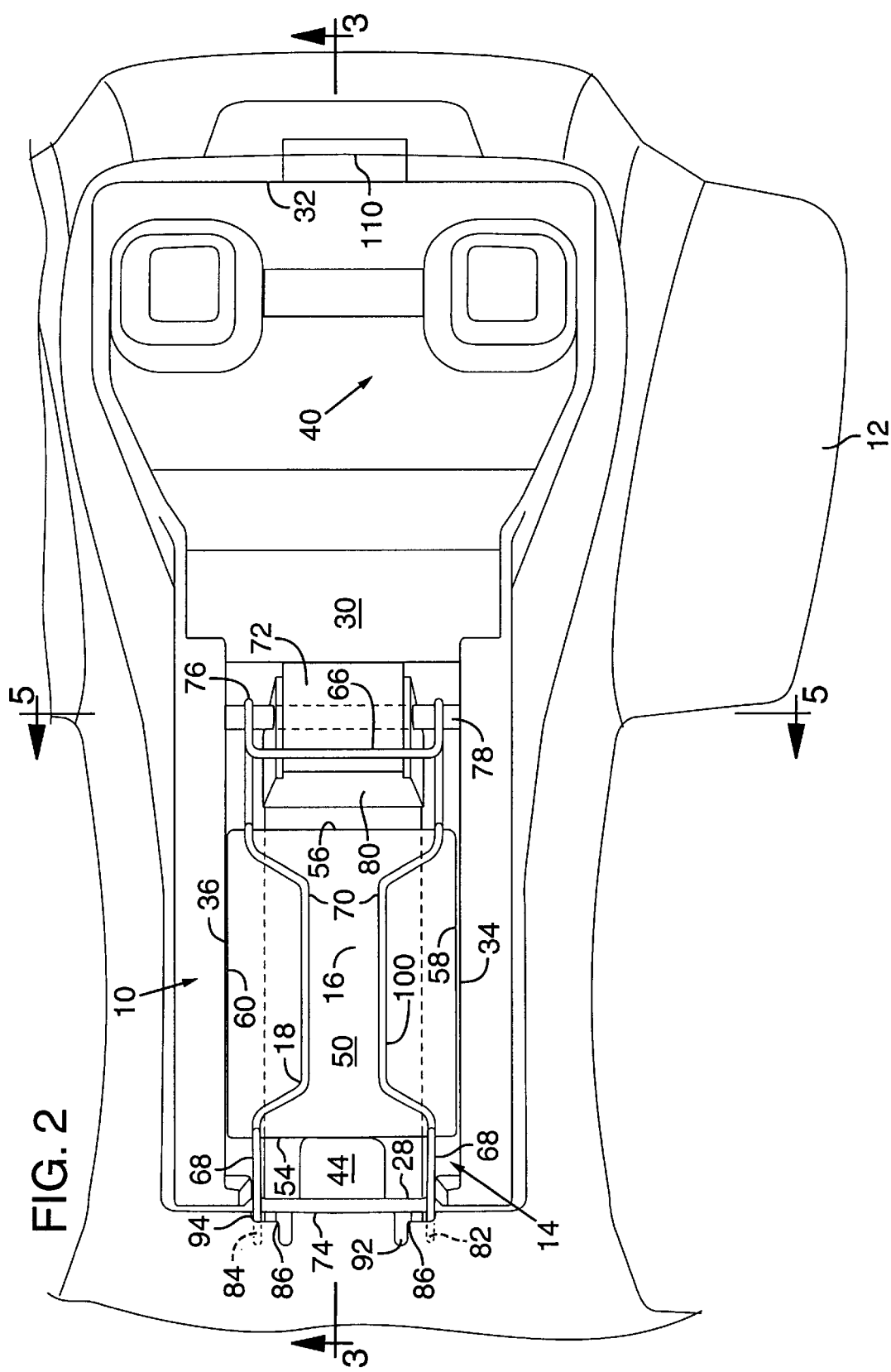
FIG. 2 is enlarged, partial, top plan view of the ride-on vehicle of FIG. 1 with the battery compartment lid removed to show a battery retaining system according to the present invention.
Figure 3:
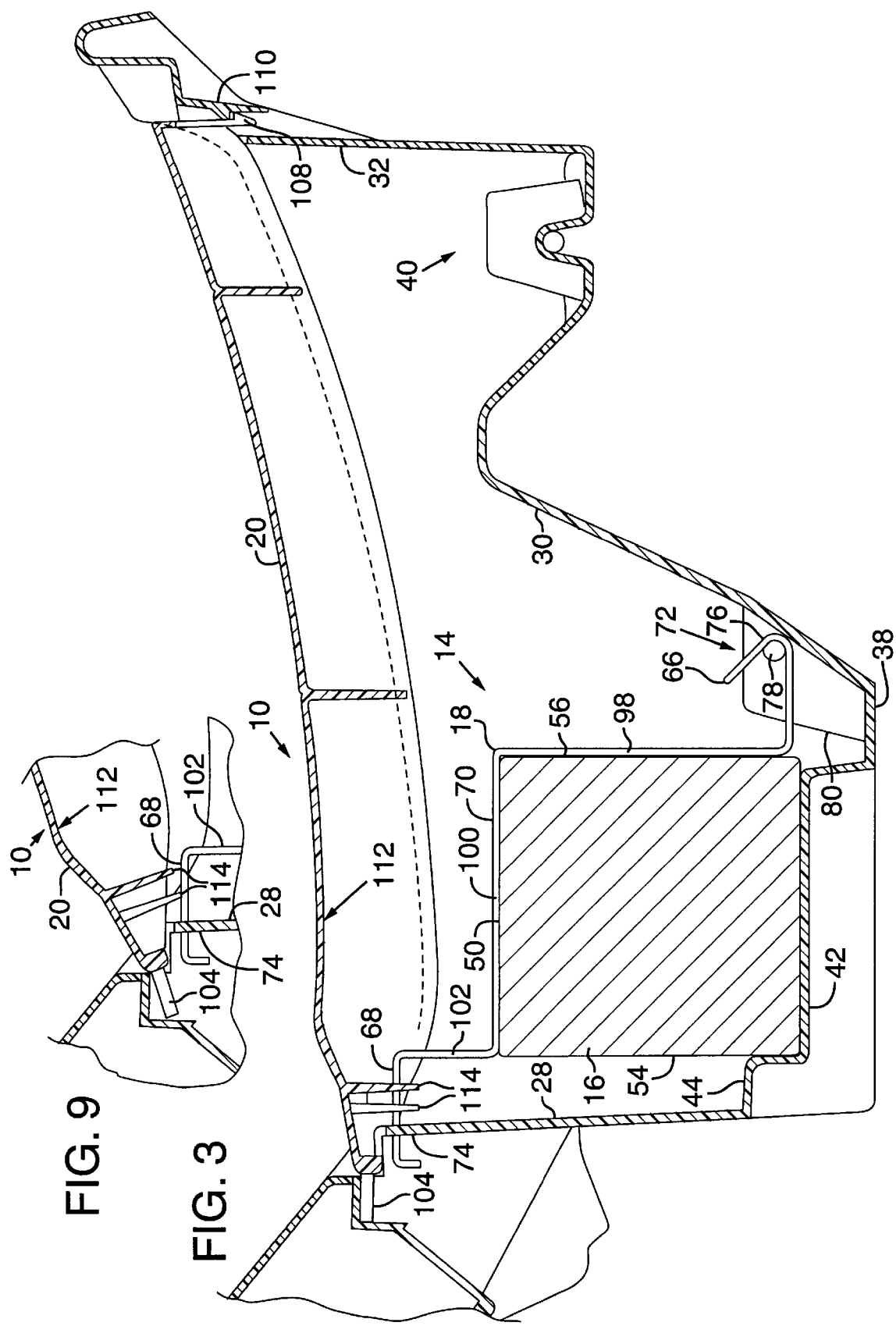
FIG. 3 is a cross-sectional view of the battery retaining system of FIG. 2 taken substantially along line 3—3 in FIG. 2, showing the retaining clip in the locked position and the battery compartment lid attached to the battery compartment.

A battery retaining system according to the present invention is shown generally at 10 in FIGS. 2 and 3. System 10 is mounted on vehicle 12 and configured to hold the battery in place during operation of the vehicle. System 10 includes a battery compartment 14 disposed on the vehicle and configured to receive a battery 16 or other solid-state power source. System 10 also includes a retaining clip 18 coupled to battery compartment 14 and configured to hold the battery in place within the battery compartment. A battery compartment lid 20 attaches to battery compartment 14 and isolates the battery from the rider. While battery 16 is shown as a single battery, it will be appreciated that a plurality of batteries may be used and connected in series or parallel as required by the drive mechanism.

Figure 4:
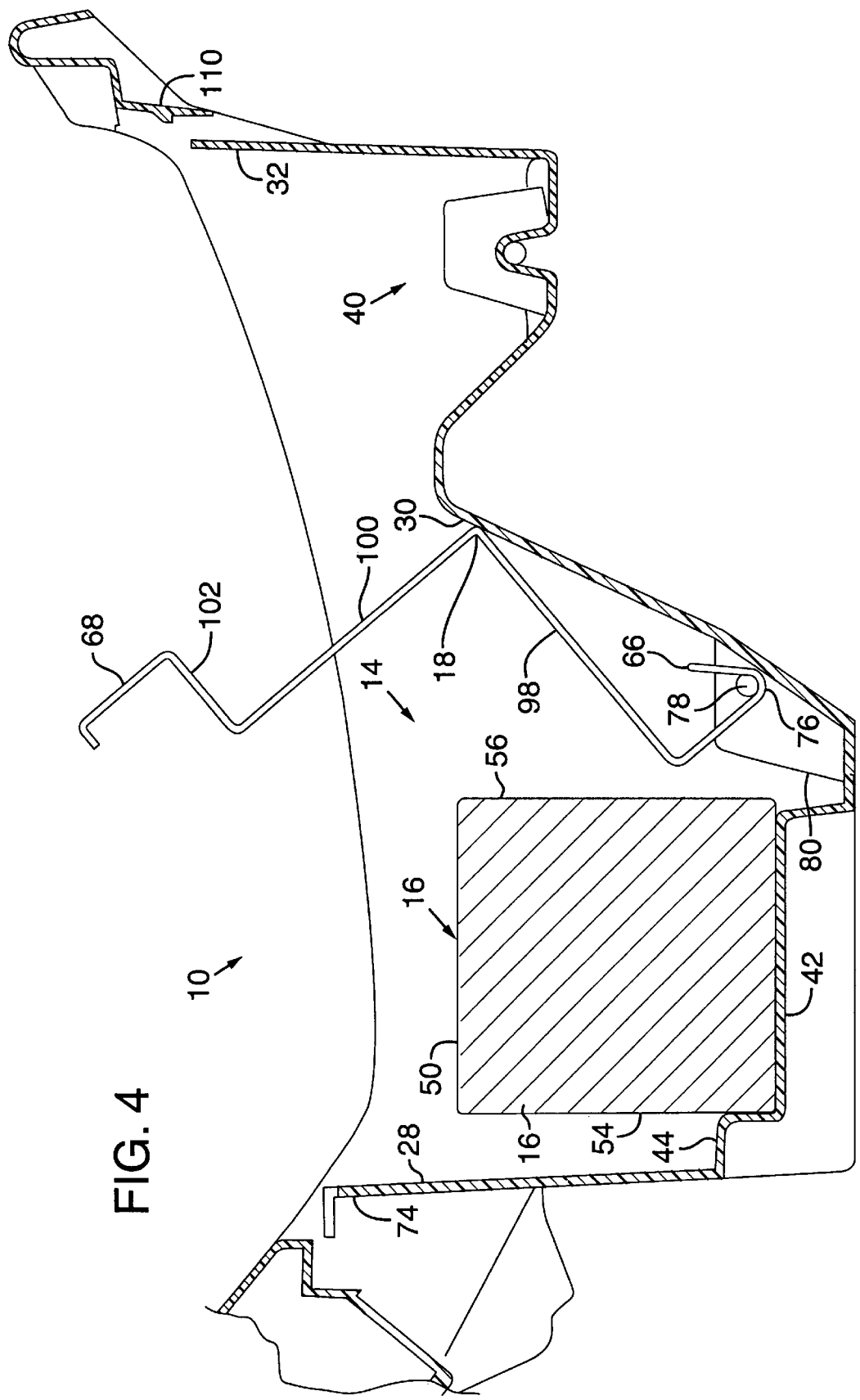
FIG. 4 is a cross-sectional view of the battery retaining system of FIG. 2 taken substantially along line 3—3 in FIG. 2, showing the battery compartment lid removed and the battery retaining clip pivoted away from the battery.
Figure 5:
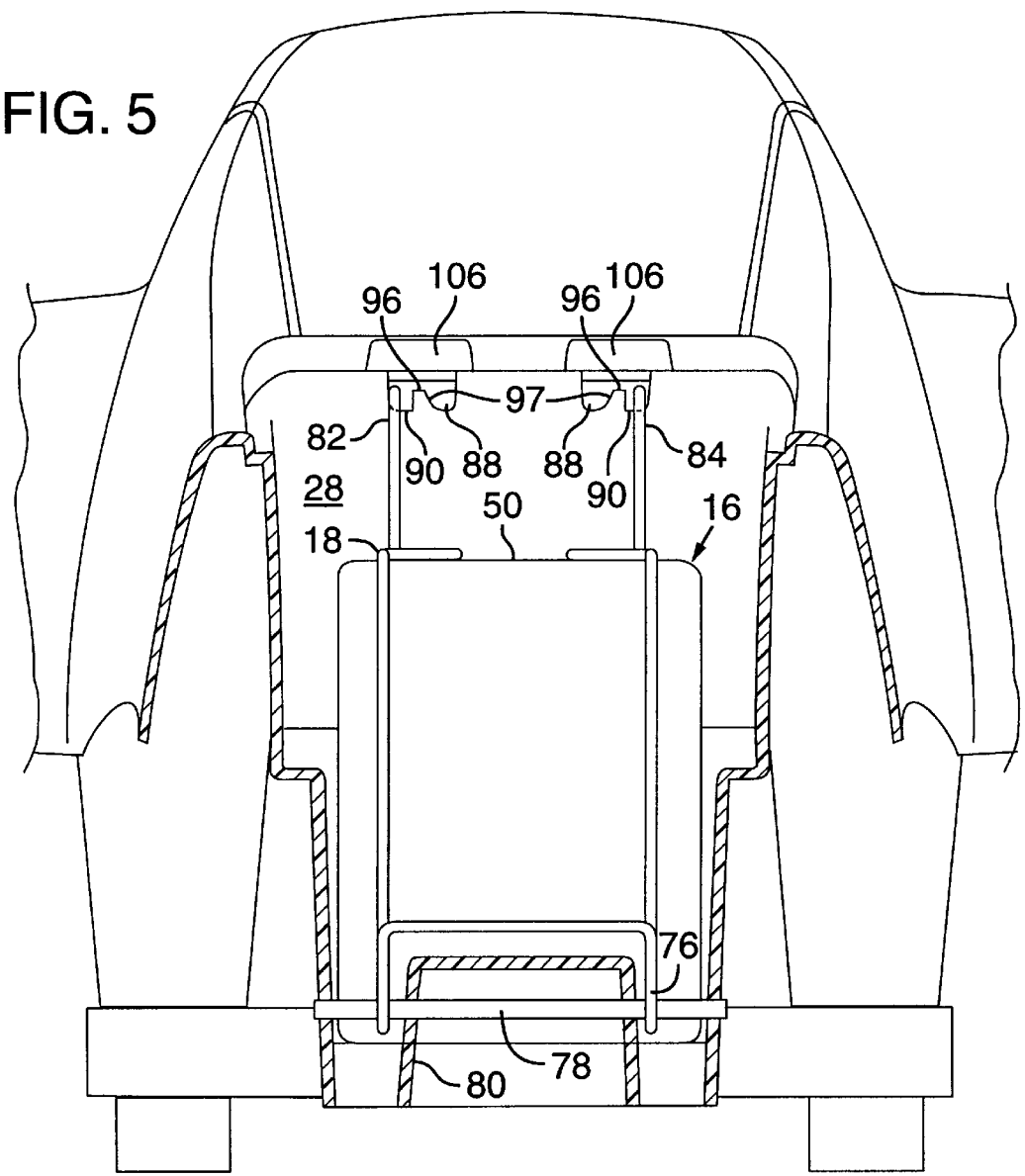
FIG. 5 is a cross-sectional view of the battery retaining system of FIG. 2 taken substantially along line 5—5 showing the retaining clip in the locked position.
Figure 6:
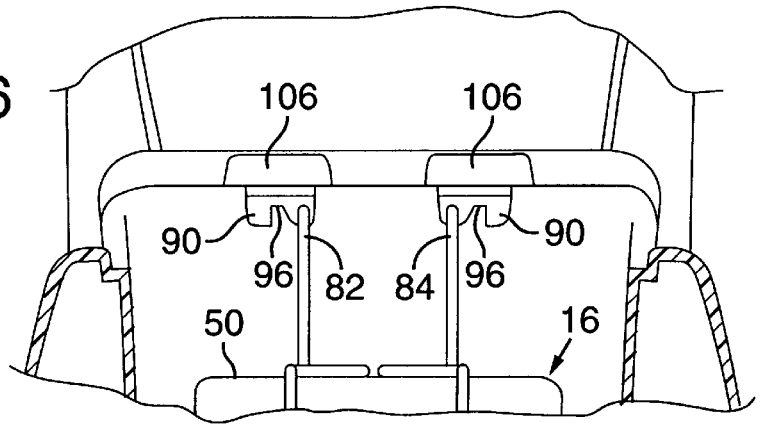
FIG. 6 is a detail view of a portion of FIG. 5 showing the retaining clip in the unlocked position.
Figure 7:
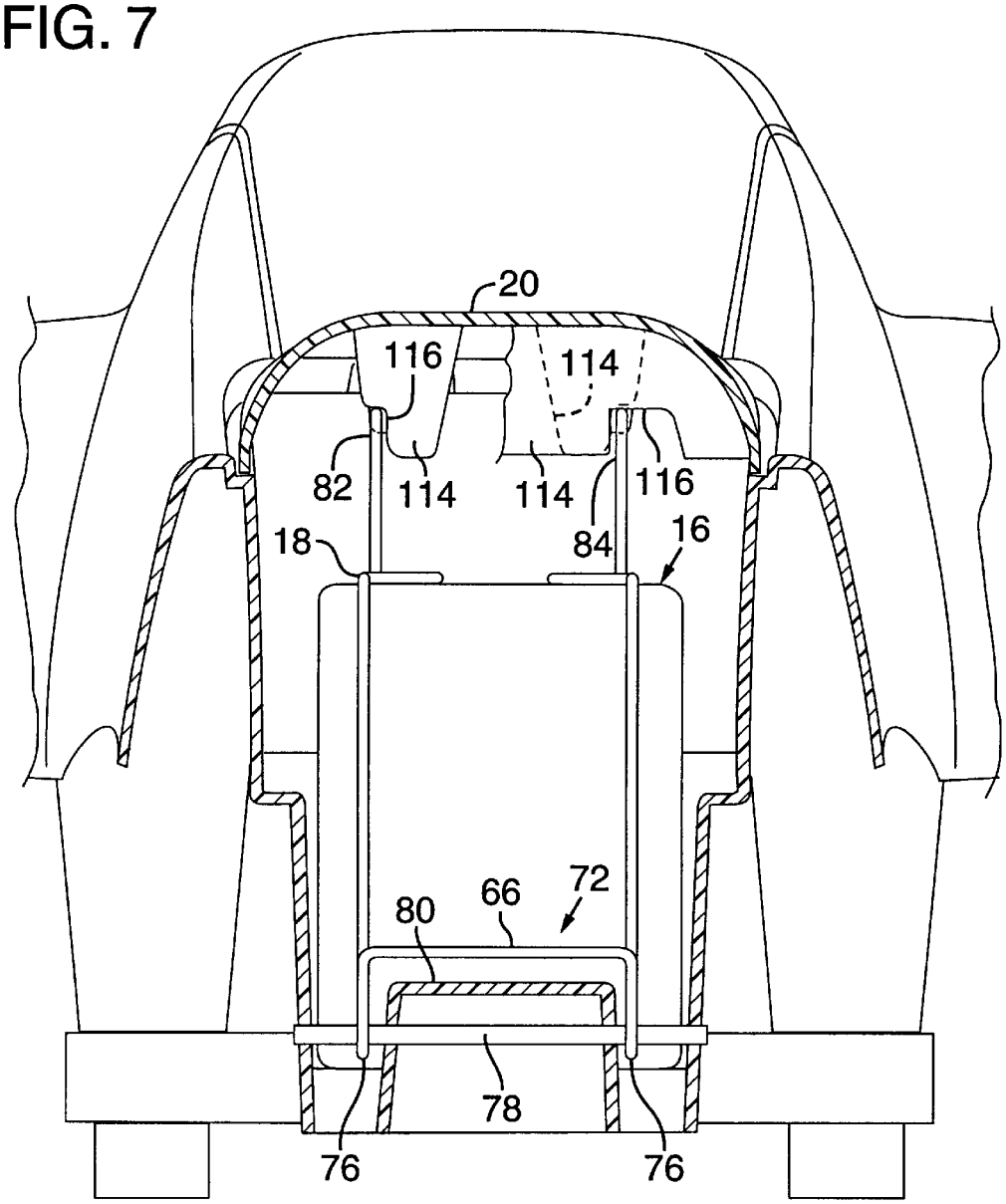
FIG. 7 is a cross-sectional view of the battery retaining system of FIG. 2 taken substantially along line 5—5 showing the retaining clip in the locked position and received into the notches in the guide members on the bottom of the battery compartment lid, which is attached to the battery compartment.

In the depicted embodiment shown in FIGS. 2–4, battery compartment 14 includes a front wall 28 spaced apart from a center wall 30. The front and center walls extend between a left wall 34 and a substantially parallel and spaced apart right wall 36 to form, along with bottom 38, a generally rectangular open box configured to receive battery 16. The depicted battery compartment extends behind center wall 30 to rear wall 32 to form an additional storage compartment 40. Alternatively, rear wall 32 may coincide with center wall 30 to form a single, undivided compartment. In any event, battery compartment 14 also includes a battery platform 42 adjacent bottom 38 and adapted to support a battery of the size required by the particular vehicle.

Battery compartment 14 is preferably configured to hold battery 16 in a stable, upright position. Left wall 34 and right wall 36 are disposed closely adjacent the left side 58 and right side 60, respectively, of the battery to prevent the battery from sliding from side to side. Front wall 28 includes a shoulder 44 adjacent a front side 54 of the battery to prevent the battery from sliding forward. As discussed in more detail below, retaining clip 18 extends adjacent the rear side 56 of the battery and over the top surface 50 to prevent the battery from sliding backward or tipping over. Once installed within the battery compartment, the battery is held securely in place during operation of the vehicle. Typically, the battery is operatively connected to a drive mechanism (not shown) to supply the power to propel the vehicle.

Retaining clip 18 includes a first end 66, a second end 68, and a central region 70 extending between the first and second ends. First end 66 is pivotally coupled to a first portion 72 of the battery compartment. In the depicted embodiment, first end 66 forms a hook 76 around a first anchor member 78. The first anchor member is in the form of a rod which passes through left wall 34, right wall 36, and a base 80 which protrudes from the center wall 30 and bottom 38 of the battery compartment. Preferably, the first end is coupled to the first anchor member so that the retaining clip cannot be removed from the battery compartment without disassembling the anchor member. This arrangement prevents a child from disabling the retaining system. In the depicted embodiment, hook 76 is U-shaped with the arms passing under the anchor member and over the base so that the retaining clip cannot be removed without detaching the anchor member from the base and battery compartment.

Second end 68 is configured to be coupled to a second portion 74 of battery compartment 14. In the depicted embodiment in which hook 76 is U-shaped, second end 68 includes a first arm 82 and a second arm 84. The first and second arms of second end 68 are substantially horizontal except for a short downward bend at the end. Arms 82 and 84 are configured to releaseably engage second anchor members 86 disposed in second portion 74. It will be understood that in the embodiment in which the second end includes only one arm, second portion 74 typically includes only one second anchor member.

Referring now to FIGS. 2–3 and 5–6, each second anchor member 86 includes an unlocking slot 88 and a locking slot 90 formed in second portion 74. Each unlocking slot 88 has an open top 92 to receive arms 82 and 84 of the second end. A tooth 96 separates locking slot 90 and unlocking slot 88. The arms of the second end are movable between the unlocking and locking slots by sliding the arm over tooth 96. Each locking slot 90 includes an overhang 94 which prevents the arm from being inserted into or removed from the locking slot except by passing over tooth 96. Preferably, tooth 96 is sized and positioned, in relation to overhang 94, to prevent the arm from passing over the tooth unless the overhang and/or the arm is flexed. This creates a snap-fit coupling so that the arm is held within the locking slot unless a defined amount of force is applied to the arm to press it over the tooth. In the depicted embodiment, tooth 94 includes a sloped side 97 adjacent the unlocking slot to allow the arm to be moved from the unlocking slot to the locking slot more easily than vice versa.

As described above, the second portion is adapted to receive the second end of the retaining clip and to retain the second end in a snap-fit, locked position in which the arms are disposed in the locking slots. In addition, the second end is movable from the locked position to an unlocked position by pressing the arms over teeth 96 so that the arms are disposed in or adjacent the unlocking slots. In the locked position, the second end releaseably engages the second anchor member and is held in place by the sides of locking slot 88 and by overhang 94. Conversely, in the unlocked position, the second end is released and uncoupled from the battery compartment and may freely be lifted away from the front wall of the battery compartment through the top 92 of unlocking slot 88.

When the retaining clip is in the locked position, central region 70 is configured to overlie at least a portion of battery 16 and to hold the battery in place within the battery compartment. In the depicted embodiment in which the first end is U-shaped, central region 70 includes first arm 82 and second arm 84. Arms 82 and 84 form a side extension 98 which joins first end 66 at a substantially right angle and extends generally upward adjacent the rear side 56 of battery 16. Adjacent the upper rear edge of the battery, central region 70 is bent at a substantially right angle to form a top extension 100 which extends across the top of the battery. Adjacent the upper front edge of the battery, central region 70 is bent at a substantially right angle to form an upper extension 102 which extends generally upward from the top of the battery to join the second end 68.

When the retaining clip is in the locked position, side extension 98 and top extension 100 cooperate with left wall 34, right wall 36, and shoulder 44 to hold the battery in place on base 80. Side extension 98 prevents the battery from sliding backward toward the center wall 30. Top extension 100 prevents the battery from being bounced or lifted off base 80. Additionally, top extension 100 prevents the battery from falling against battery compartment lid 20 in the event that vehicle 12 is tipped over.

As shown in FIG. 2, the top extension of the retaining clip may include additional bends adjacent the top of the battery to provide clearance for structures on the top of the battery and/or to increase the structural rigidity of the retaining clip. Similarly, the side extension and upper extension may also include additional bends. The shape and number of any additional bends will vary depending on the configuration of the battery and battery compartment, while remaining within the scope of the invention.

While the retaining clip has been shown and described as extending adjacent the rear and across the top of the battery, it will be appreciated that there are many other configurations within the scope of the invention. For example, the side extension may be disposed along the front, left, or right side of the battery instead of, or in addition to, the rear side. Similarly, the top extension may overlie a portion of the top of the battery rather than extending entirely across the battery. Further, in the depicted embodiment, the first anchor member is disposed adjacent the bottom of the rear side of the battery, while the second anchor member is disposed adjacent the top of the front side of the battery. However, the first and second anchor members may alternatively be disposed at other positions around the battery.

As discussed above, second end 68 of the retaining clip may be lifted away from second anchor member 86 when the second end is in the unlocked position. Additionally, the pivoting coupling between first end 66 and first anchor member 78 allows the second end to be pivoted from the unlocked position to an opened position in which central region 70 is spaced away from the battery. As shown in FIG. 4, when the retaining clip is in the opened position, side extension 98 leans backward against center wall 30 so that top extension 100 is removed from above the battery.

In the opened position, the retaining clip is fully disengaged from the battery so that the battery may be loaded into, or unloaded from the battery compartment. Pivoting the retaining clip to the opened position also permits unobstructed access to the battery for charging, servicing, etc. Once the battery is ready for use, the retaining clip is pivoted down over the battery until arms 82 and 84 of the second end are disposed within unlocking slots 88. The arms are then pressed over teeth 96 to engage locking slots 90, at which point the retaining clip is in the locked position and the battery is securely held in place.

In the depicted embodiment, battery compartment 14 is disposed beneath the rider and battery compartment lid 20 forms the seat of the vehicle. However, it will be appreciated that other configurations are possible and within the scope of the invention. For example, lid 20 may be a smaller sized covering disposed beneath a removable vehicle seat. Alternatively, the battery compartment may be located in a position other than under the rider, including in the trunk or engine compartment of a ride-on car or truck.

Figure 10:
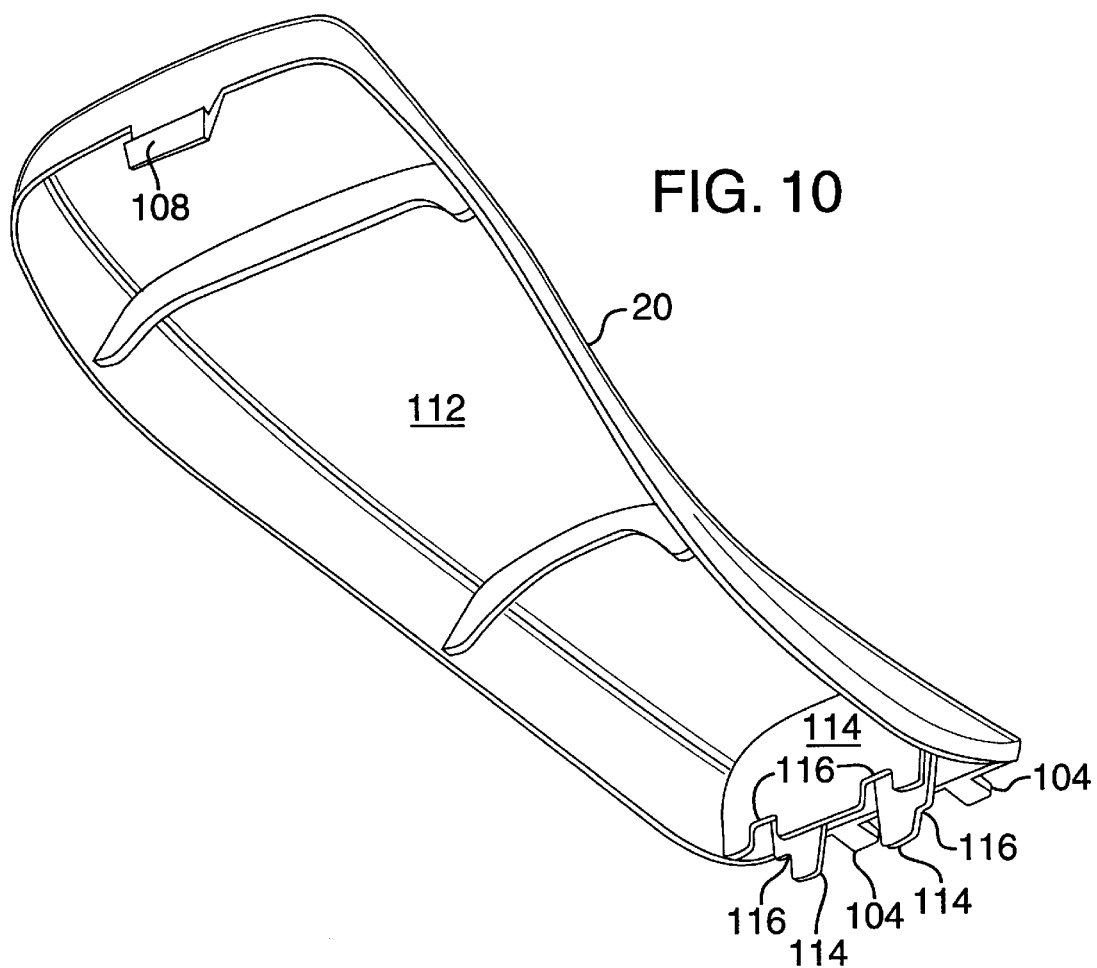
FIG. 10 is an isometric view showing the configuration of the battery compartment lid.

In any event, battery compartment lid 20 is configured to attach to battery compartment 14 and isolate the battery from the rider. As shown in FIGS. 3 and 10, the front of lid 20 typically includes one or more tabs 104 adapted to engage opposing sockets 106 above the front wall of the battery compartment. The rear of lid 20 includes a latch arm 108 adapted to engage a flexible latch arm 110 on the rear wall of the battery compartment. When tabs 104 are positioned in sockets 106, the rear of the lid can be pressed down on the battery compartment causing flexible latch arm 110 to be flexed backward by latch arm 108 until the latch arms engage. Once the latch arms engage, the lid is held down tightly on the battery compartment.

To remove the lid, flexible latch arm 110 may be gripped and flexed backward to disengage from latch arm 108, allowing the rear of the lid to be lifted up. The lid is then pulled backward slightly to disengage tabs 104 from sockets 106, at which point the lid may be lifted away from the battery compartment.

In one embodiment, retaining clip 18 is configured to block attachment of the battery compartment lid when the clip is in the unlocked position. As shown FIGS. 7–10, bottom 112 of lid 20 includes one or more guide members 114 configured to extend into the battery compartment when the lid is attached to the battery compartment. Guide members 114 include notches 116 aligned to receive arms 82 and 84 of second end 68 when the retaining clip is in the locked position. Conversely, when the retaining clip is in the unlocked position, arms 82 and 84 are not aligned with notches 116, causing guide members 114 to deflect against the retaining clip and prevent attachment of the lid. Similarly, when the second end is lifted away from the second anchor member, installation of the lid is blocked by central region 70 and/or second end 68.

Figure 8:
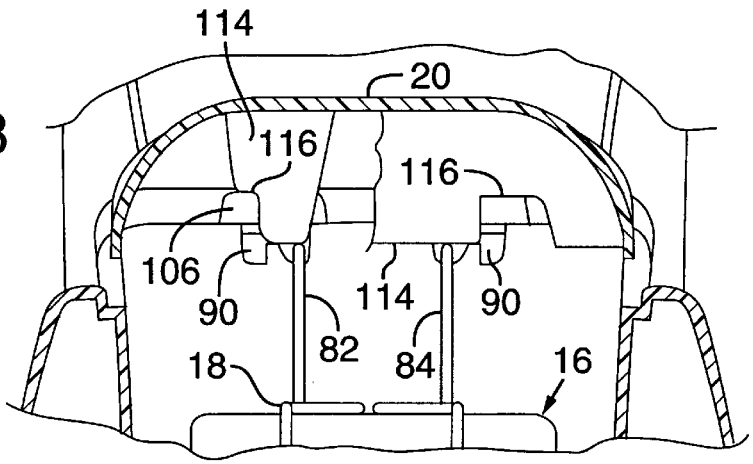
FIG. 8 is a detail view of a portion of FIG. 7 showing the retaining clip in the unlocked position and the guide members deflecting against the retaining clip to block attachment of the battery compartment lid. The rear-most guide member is shown in partial cut-away view to show the forward guide member.

Any attempt to install the battery compartment lid when the retaining clip is in the unlocked position will be difficult, if not impossible. As shown in FIG. 9, if tabs 104 are inserted into sockets 106, the guide members will strike the retaining clip and prevent the rear of the lid from being attached. Conversely, as shown in FIG. 8, if the rear of the lid is attached first, the guide members will strike the retaining clip, preventing the front end of the lid from being attached.

Thus, the battery compartment lid cannot be attached to the battery compartment unless the retaining clip is in the locked position. The inability to attach the lid provides an unmistakable signal to alert the user that the battery is not properly secured. Furthermore, when the lid forms the vehicle seat, the rider is unable to sit on the seat unless the retaining clip is first placed in the locked position to secure the battery. Therefore, the invented system provides an unavoidable safety device for a children's ride-on vehicle. An additional advantage of the invented system is that when the lid is attached to the battery compartment, guide members 114 prevent arms 82 and 84 from accidentally becoming dislodged from the locking slots and moving from the locked position to the unlocked position.

As described above, the invented battery retaining system provides a reliable and inexpensive structure for holding a battery securely in place in a children's ride-on vehicle. It will be appreciated that the different components of the invented system may be constructed of various materials as required by the application. Typically, the vehicle, battery compartment, and battery compartment lid are formed of a rigid plastic and/or metal. The retaining clip is typically formed of a heavy gauge metal wire or rod having a diameter of approximately 0.125 inches. Alternatively, depending on the weight and configuration of the battery, the retaining clip may have a larger or smaller diameter and may be formed of other materials including plastic.

While the invention has been disclosed in its preferred form, the specific embodiments thereof as disclosed and illustrated herein are not to be considered in a limiting sense as numerous variations are possible. Applicant regards the subject matter of his invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower or equal in scope to the original claims.

I claim:

1. A battery-powered children's ride-on vehicle, comprising:
   a battery;
   a rider-support frame adapted for a child, including a plurality of wheels and a battery compartment configured to receive the battery;
   a drive unit including a battery-powered power source configured to drive one or more of the plural wheels;
   a battery compartment lid attachable to the battery compartment; and
   a battery retaining clip coupled to the battery compartment and movable between a locked position in which the clip holds the battery in place, and an unlocked position in which the clip blocks attachment of the battery compartment lid;

where the clip engages the battery compartment in a snap-fit coupling when moved from the unlocked position to the locked position, the snap-fit coupling being adapted to retain the clip in the locked position.

2. The vehicle of claim 1, wherein the retaining clip includes a first end pivotally coupled to a first portion of the battery compartment, a central region, and a second end movable from the locked position where the second end is coupled to a second portion of the battery compartment, to the unlocked position where the second end is uncoupled from the battery compartment;

where the second portion of the battery compartment includes at least one unlocking slot and at least one locking slot, each adapted to receive the second end of the retaining clip, and where the second end of the clip is in the unlocked position when disposed within the at least one unlocking slot and in the locked position when disposed within the at least one locking slot.

3. The vehicle of claim 2, wherein the central region of the retaining clip is configured to overlie at least a portion of the battery when the second end is in the locked position.

4. The vehicle of claim 3, wherein the second end of the retaining clip may be pivoted from the unlocked position to an opened position in which the central portion is spaced away from the battery to allow the battery to be loaded into or unloaded from the battery compartment.

5. The vehicle of claim 2, wherein the second portion of the battery compartment includes at least one tooth between the at least one unlocking slot and the at least one locking slot, and where the second end of the clip is movable from the at least one unlocking slot over the at least one tooth to be received in a snap-fit coupling in the at least one locking slot.

6. The vehicle of claim 5, where the second end of the retaining clip is movable from the at least one locking slot over the at least one tooth and into the at least one unlocking slot.

7. The vehicle of claim 6, wherein the at least one tooth is configured to allow the second end of the retaining clip to be moved from the at least one unlocking slot to the at least one locking slot more easily than from the at least one locking slot to the at least one unlocking slot.

8. The vehicle of claim 5, where the at least one tooth is configured so that at least one of the second end of the retaining clip or the second portion of the battery compartment must be flexed to move the second end of the retaining clip over the at least one tooth.

9. The vehicle of claim 2, further comprising an anchor member attached to the battery compartment, and wherein the first end of the retaining clip forms a hook around the anchor member so that the retaining clip cannot be removed from the battery compartment without detaching the anchor member from the battery compartment.

10. The vehicle of claim 1, wherein the battery compartment lid includes at least one guide member configured to extend into the battery compartment and positioned to deflect against the retaining clip and prevent attachment of the lid unless the clip is in the locked position.

11. The vehicle of claim 10, wherein the guide member is configured to receive the retaining clip and to prevent the retaining clip from moving from the locked position to the unlocked position when the battery compartment lid is attached to the battery compartment.

12. The vehicle of claim 1, wherein the battery compartment lid forms a seat of the vehicle, the seat being adapted to receive a child.

13. A battery-powered children's ride-on vehicle, comprising:

a battery;

a rider-support frame adapted for a child, including a plurality of wheels and a battery compartment adapted to hold the battery;

a drive unit including a battery-powered power source configured to drive at least one of the plural wheels;

a battery retaining clip including a first end pivotally coupled to a first portion of the battery compartment, and a second end configured to releasably engage a second portion of the battery compartment; and a battery compartment lid attachable to the battery compartment;

where the second end includes two spaced-apart arms movable between locked positions in which the retaining clip holds the battery within the battery compartment, and unlocked positions in which the retaining clip blocks attachment of the battery compartment lid; and where the spacing between the two arms is different when the arms are in the locked position than when the arms are in the unlocked position.

14. The vehicle of claim 13, wherein the battery compartment lid includes at least one guide member configured to extend into the battery compartment between the two arms when the arms are in the locked positions.

15. The vehicle of claim 14, wherein the at least one guide member prevents the two arms from moving into the unlocked positions when the guide member extends between the two arms.

16. The vehicle of claim 13, wherein the second end may be pivoted from the unlocked position to an opened position in which the central portion is spaced away from the battery to allow the battery to be loaded into or unloaded from the vehicle.

17. A battery-powered children's ride-on vehicle, comprising:

a battery;

a plastic rider-support frame adapted for a child, and having a plurality of wheels and a battery compartment configured to receive the battery;

a drive unit including a battery-powered power source configured to drive at least one of the plural wheels;

a battery compartment lid attachable to the battery compartment and forming a seat adapted to receive a child; and a battery retaining clip pivotally coupled to the battery compartment and movable between a locked position in which the clip holds the battery in place, and an unlocked position in which the clip blocks attachment of the battery compartment lid.

\* \* \* \* \*